July 10, 1934. J. M. HENDRICKSON Re. 19,233

AEROPLANE FLIGHT CONTROL

Original Filed March 6, 1931 3 Sheets-Sheet 1

Inventor

James M. Hendrickson.

By Edward A. Lawrence.

his Attorney

July 10, 1934. J. M. HENDRICKSON Re. 19,233

AEROPLANE FLIGHT CONTROL

Original Filed March 6, 1931 3 Sheets-Sheet 2

Inventor

James M. Hendrickson

By Edward A. Lawrence his Attorney

July 10, 1934. J. M. HENDRICKSON Re. 19,233

AEROPLANE FLIGHT CONTROL

Original Filed March 6, 1931 3 Sheets-Sheet 3

Inventor

James M. Hendrickson
by Edward A. Lawrence
his Attorney

Reissued July 10, 1934

Re. 19,233

UNITED STATES PATENT OFFICE 19,233

AEROPLANE FLIGHT CONTROL

James M. Hendrickson, McKeesport, Pa.

Original No. 1,866,596, dated July 12, 1932, Serial No. 520,731, March 6, 1931. Application for reissue and division February 28, 1933, Serial No. 659,002

9 Claims. (Cl. 244—29)

Among the objects which I have in view is the provision of a new and improved electrically operating control which is connected up with the ailerons and/or the elevators whereby lateral and/or longitudinal tipping is automatically corrected and the aeroplane maintained level in normal flight.

For this purpose I have invented a new and improved control tube which tips or loses its level position with the plane and which when tipped establishes electrical circuits through solenoids which are connected up to operate the ailerons and/or the elevators.

I also have invented an improvement in the solenoids employed to operate the ailerons and/or the elevators, the same being divided into sections so that the proper connection will be provided dependent upon the amount of digression from normal flight.

Again I provide means for automatically righting an aeroplane which has become inverted in flight.

Again I have applied the principles of my invention to use in connection with a radio or other altimeter whereby the aeroplane will be automatically maintained at a predetermined elevation of flight.

My improved control tube or electric switch is adaptable for use generally in connection with electric circuits.

Other novel features of construction, and also of arrangement of parts will appear from the following description.

In the accompanying drawings wherein I have illustrated the practical embodiments of the principles of my invention, Fig. 1 is a diagrammatic view showing one of my improved stabilizer tubes connected up with a pair of oppositely disposed solenoids and arranged for automatically operating either the ailerons or elevators of an aeroplane.

Figure 1:
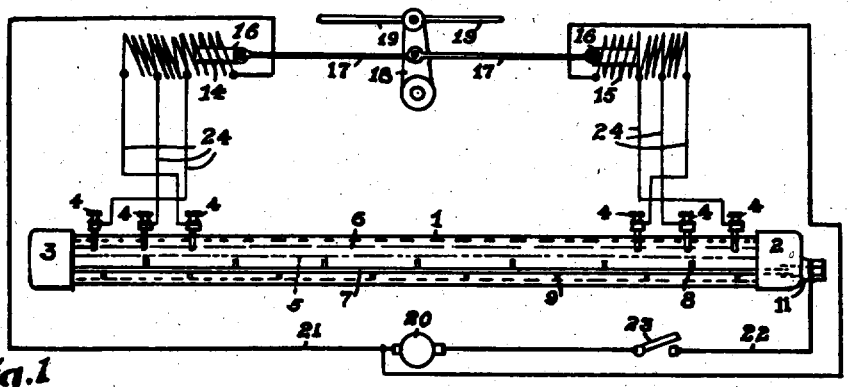

Referring first to Figs. 1 to 5 inclusive, 1 represents a tube formed of suitable non-conducting material. In Fig. 1 I have indicated the tube as formed of transparent material such as glass, but in practice a less fragile material, such as bakelite, is preferable. The ends of the tube are sealed as by the caps 2 and 3 which may be screwed onto the ends of the tube.

The tube is mounted on the aeroplane in such manner as to be horizontal when the aeroplane is in normal level flight.

Along its top center line and adjacent to either end of the tube the wall of the latter is provided with a series of spaced apart holes through which the contact posts 4 are downwardly inserted. The holes and the posts are threaded to secure the posts in position and also to permit an adjustment of the protrusion of the posts into the interior of the tube, thus adjusting the sensitivity of the stabilizer.

In the lower portion of the tube is contained a body 5 of liquid which is a good conductor of electricity, such as mercury. The top level of the liquid 5, when the tube is horizontal, is below the lower extremities of the posts 4. The posts are adjusted relative to the top level of the mercury to obtain the sensitivity desired in the operation of the control tube. Above the level of the mercury is a body 6 of non-electrolytic fluid, preferably a liquid of low viscosity, such, for instance, as carbon tetra-chloride. The posts must be of material which will not alloy with the mercury or other fluid.

When the tube is horizontal the lower ends of the posts are immersed in the liquid 6 and such liquid lies between the extremities of the posts and the mercury, thus preventing arcing or spark jumping.

I provide a surge-preventer for the mercury. Thus I have shown a bar 7 which is preferably flat and of material which will not alloy with the mercury or other fluid, such as steel or iron. At intervals the material of the bar is cut and alternately bent upwardly and downwardly to form the fins 8 and 9, respectively, which fins are immersed in the mercury and prevent the mercury from surging as the tube is tipped. One end of the bar 7 is provided with a threaded contact post 10 which extends through a snugly fitting cylindrical neck 11 in the cap 2. The other or inner end of the bar 7 is suitably suported as by insertion into a slot 12 formed in the inner end of a cylindrical boss 13 of the cap 3. The slot 12 may be annular in form so that a portion thereof will always be properly disposed to receive the inner end of the bar 7. The surge-preventer acts as a conductor of the electric current.

14 and 15 represent a pair of solenoids oppositely disposed and having their cores 16 connected as by links 17 to a pivoted lever 18 which is coupled as by links 19 to the controls, such as the ailerons or the elevators of the aeroplane.

20 represents the source of electric current, preferably a dynamo which may be driven by the aeroplane motor.

One side of the dynamo 20 is connected by the branched wire 21 with the front ends of the coils of the two solenoids while the other side of the dynamo is connected by the wire 22 with the binding post 10. The ground circuit is provided with a switch 23 convenient to the hand of the operator of the aeroplane. The switch is arranged so that the entire control circuit may be thrown into or out of operation at the will of the operator.

The coils of the solenoids are preferably divided into sections as shown, the number of sections being equal to the number of binding posts 4 at each end of the tube 1. Thus I have shown three binding posts at each end of the tube and the coils each divided into three sections. The number of sections into which the solenoids are divided and likewise the number of binding posts 4 depends upon the sensitivity desired for the control. The outer ends of each of such sections are connected by a wire 24 with the correspondingly positioned binding post.

Figure 2:
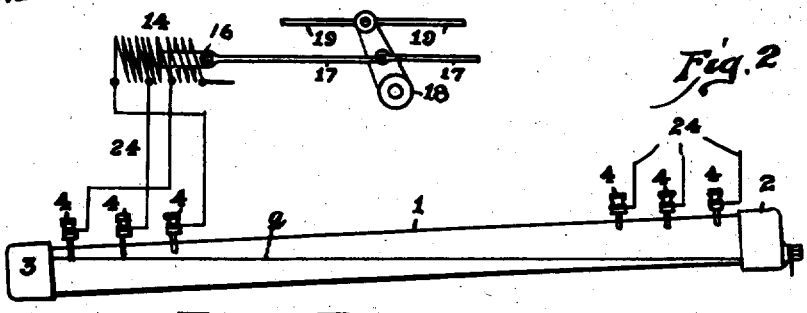
Fig. 2 is a similar view but incomplete showing the tube tipped and one of the sections of one of the solenoid energized.
Figure 3:
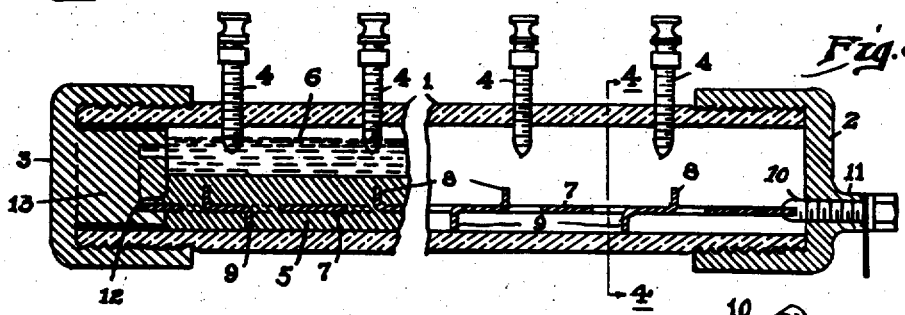
Fig. 3 is a broken longitudinal section on enlarged scale of the tube, the conductive liquid and the non-electrolytic fluid being shown only at one end.
Figure 4:
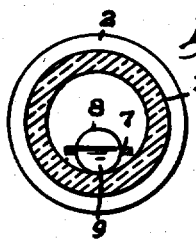
Fig. 4 is a cross section of the tube taken along the line 4—4 in Fig. 3.
Figure 5:
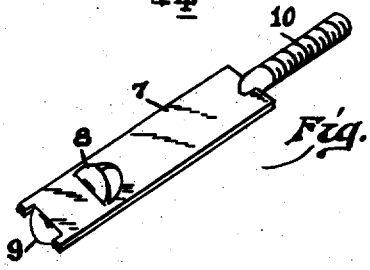
Fig. 5 is a broken perspective of the surge-preventer.

With the switch 23 closed and the tube 1 in a horizontal position as it is when the aeroplane is in normal level flight, the posts 4 are all out of contact with the mercury in the tube and thus the circuit which includes the dynamo is broken and the solenoids are disenergized and the controls are not activated, but when the tube tips, as it does as the aeroplane assumes a non-level position, the mercury will rise at the lower end of the tube, as indicated by the line *a* in Fig. 2, thus bringing it into contact with the first binding post 4 at the left end of the tube and thus completing the circuit which includes the first section of the coil of the solenoid 14 and causing the lever 18 to be swung counterclockwise, thereby shifting the ailerons or the elevators, as the case may be, to restore the aeroplane to normal flying position. In case the angle of the tip is sufficiently great the next or the remaining posts at the end of the tube will be brought into electrical contact with the mercury, thus energizing the next or the remaining sections of the solenoid coil and thus setting the controls at a greater angle of compensation to bring the aeroplane back to normal through a greater arc.

In practice I make the first sections of the solenoid coils of sufficient strength to move the controls against maximum resistance. The other sections are supplementary to increase the angles of control movement.

When the aeroplane is brought back into normal flying position, the contact between the posts and the mercury is interrupted by the leveling of the tube, the solenoid is disenergized and the controls return to normal.

Insomuch as mercury and similar conductive liquids are unstable, it is necessary to prevent the surging of the liquid, since otherwise intermittent contacts with the posts might ensue, confusing and impairing the operation of the automatic control. I am able by means of my surge-preventer to render the mercury stable. Again the use of the surge-preventer as a conductor of the current provides a route of less resistance through the mercury to the points of contact and lessens the resistance of the travel of the current through the mercury when contact is made.

The non-electrolytic fluid prevents the oxidization of the mercury which would render it too sluggish and also prevents the vaporization of the mercury due to spark gaps which would result in arcs.

The non-electrolytic substance should have no chemical reaction with the conductive liquid and should have so much less specific gravity that it will always remain superimposed on the mercury and will not form an emulsion therewith as a result of vibration.

Figure 6:
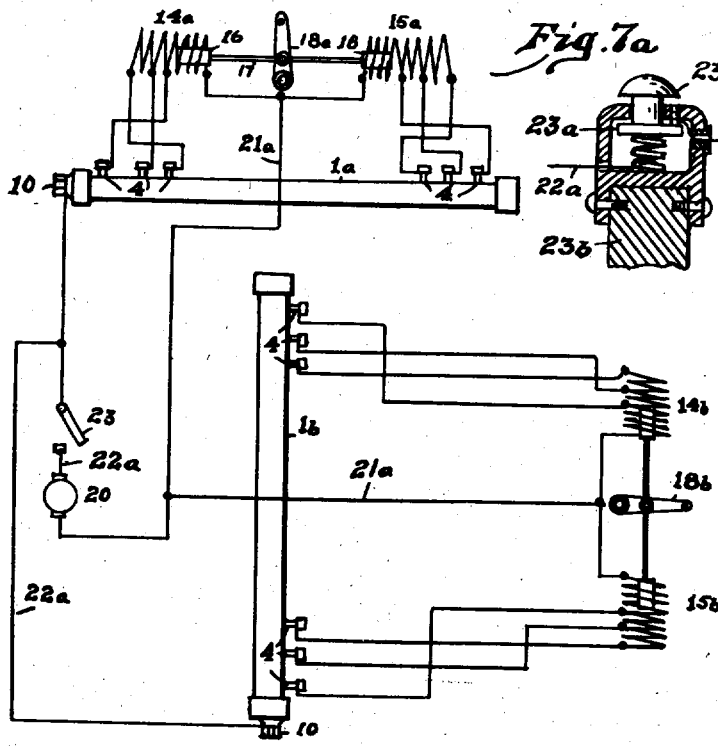
Fig. 6 is a diagrammatic view showing a pair of my improved stabilizer tubes arranged for the control of the ailerons and the elevators to automatically return the airship to and maintain it in its normal level flying position.

Referring now to Fig. 6, I have shown the application of my improved stabilizer tubes to the automatic control of both the ailerons and the elevators of an aeroplane.

Thus one of the tubes, indicated at 1*a*, is positioned transversely of the aeroplane so as to be responsive to lateral tipping of the latter, and the posts 4 of said tube are connected to the opposed solenoids 14*a* and 15*a* whose cores are linked to the lever 18*a* which is connected up to the ailerons. Again a second stabilizer tube, indicated at 1*b*, is disposed longitudinally of the aeroplane, so as to be responsive to the ascent or descent of the latter. The posts 4 at the opposite end of the tube 1*b* are connected up, respectively, to the coils of the opposed solenoids 14*b* and 15*b* which are linked to the lever 18*b* which in turn is connected to the elevators of the aeroplane.

The lead 21*a* from one side of the dynamo 20 is connected to all the solenoid coils, while the opposite lead 22*a* of the dynamo is connected to the posts 10 of the two tubes 1*a* and 1*b*. 23 represents the control switch placed convenient to the hand of the operator.

Figure 7A:
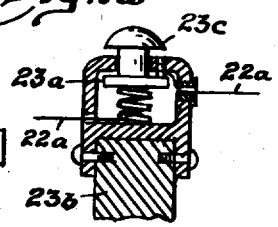
Fig. 7a is a detail in enlarged section illustrating the preferred arrangement of the control switch.

The preferred arrangement of this switch is illustrated in Fig. 7*a*, the electrical connection between the portions of the lead 22*a* being normally maintained by the disk 23*a* which is spring pressed in place. The switch is mounted on the control stick 23*b* within reach of the operator's hand. When the operator wishes to put the automatic control out of operation, as when landing or taking off, he presses the button 23*c* downwardly and this interrupts the lead 22*a*. If he loses consciousness the switch automatically closes and puts the control into operation.

It is obvious that the aeroplane would be automatically returned to normal flying position when a deviation therefrom occurs. In taking off and in landing the switch 23 is thrown open.

Figure 7:
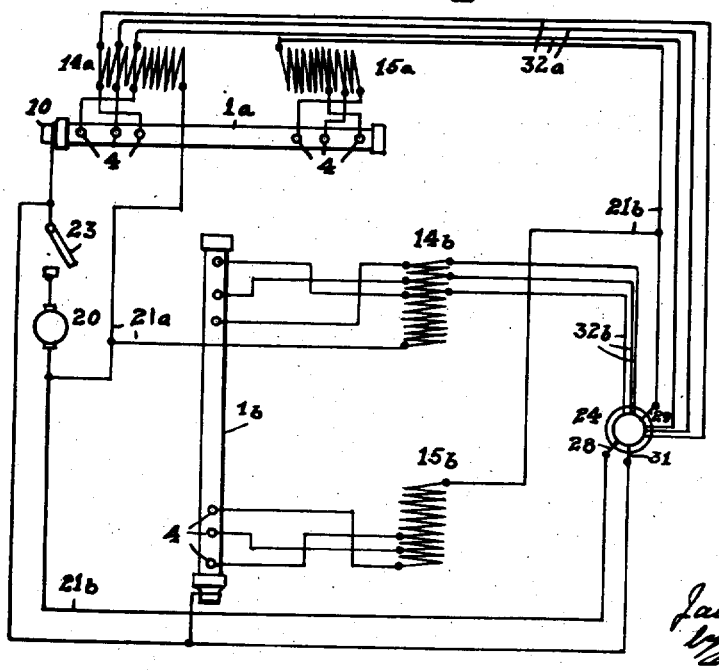
Fig. 7 is a diagrammatic view showing the combination with the arrangement shown in Fig. 6 of means for righting an inverted aeroplane.

In Fig. 7 I have shown the control illustrated in Fig. 6, arranged to automatically right an aeroplane which is traveling in an inverted or upset state. In this case the branched lead 21*a* is connected to the solenoids 14*a* and 14*b* which are arranged to activate the left aileron and the up-elevators, while the solenoids 15*a* and 15*b* which activate the right aileron and the down-elevators are connected to a branch conductor 21*b* leading from the lead 21*a* and in which control tube 24 is interposed.

Figure 8:
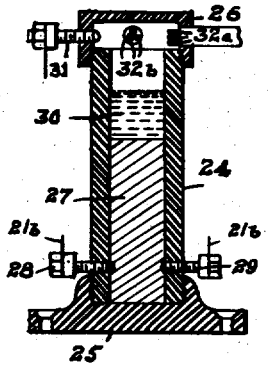
Fig. 8 is an enlarged vertical section of the vertical control tube.

The tube 24, which is shown in detail in Fig. 8, is vertically disposed while the aeroplane is in normal flight. The tube comprises a cylindrical portion formed of bakelite or some other suitable non-conductive material, which is mounted in a base 25 which may be secured to a portion of the fuselage. The top of the tube is closed by a cap 26.

27 represents a body of conductive liquid, such as mercury, which when the aeroplane is right side up occupies the lower portion of the tube and forms an electric connection between the two opposed binding posts 28 and 29 which extend through the wall of the tube adjacent to its lower end. These posts are connected to the ends of the conductor 21*b* at the interruption in the latter as illustrated in Fig. 7.

In the tube 24 above the mercury is a body of non-electrolytic fluid 30.

The cap 26, which may be of non-conductive material, is provided with a binding post 31 which extends through the side wall of the cap and said post 31 is connected by a branch conductor 22*b* with the lead 22*a*. 32*a* represents wires connected to the sections of the solenoid 14*a* and 32*b* represents wires connected to the sections of the solenoid 14*b* and these two groups of wires are led into the interior of the tube 24 at different points through holes in the side wall of the cap 26, the said groups being normally insulated from each other and from the binding post 31. When the aeroplane is inverted and the tube 24 is likewise inverted, the mercury flows to the opposite end of the tube 24, thus interrupting the continuity of the conductor 21*b* and breaking the electrical connections between the solenoids 15*a* and 15*b* and the dynamo, thereby preventing the right aileron from being thrown to raise the right wing of the plane and also preventing the elevators from being set to direct the plane upwardly. Simultaneously the mercury now establishes electrical connection between the binding post 31 and the ends of the wires 32*a* and 32*b*, thus energizing the solenoids 14*a* and 14*b*, and thereby setting the left aileron and the up-elevator to cause the aeroplane to right itself.

Again I show in connection with the automatic control means already described, the employment of a radio frequency altimeter for automatically maintaining an aeroplane at a predetermined elevation above the ground. This arrangement is illustrated in Figs. 9 and 10 of the drawings.

The radio frequency altimeter is not per se the subject matter of the present invention, and therefore I have simply indicated it generally in the drawings instead of illustrating and describing its construction in detail. It is sufficient for the present purposes to state that it comprises a plurality of signals, usually incandescent lamps, which indicate elevations. In the present practice the operator of the aeroplane notes such signals and operates his controls when necessary to correct faults in elevation. Therefore as now employed, the effectiveness and the usefulness of the radio altimeter is limited by the necessity of the conscious cooperation of the operator.

The radio altimeter is indicated at 33 and it is shown provided with three signal lamps 34*a*, 34*b* and 34*c*. The lamp 34*a*, usually green, is illuminated when the aeroplane is at or above the predetermined elevation above the ground, for example at an elevation of one thousand feet; the lamp 34*b*, usually showing yellow, is illuminated when the plane descends below the predetermined elevation, say one thousand feet, but before it descends to what may be regarded as a dangerously low elevation, say five hundred feet, while the lamp 34*c*, usually showing red, is illuminated when the aeroplane descends below five hundred feet.

Figure 9:
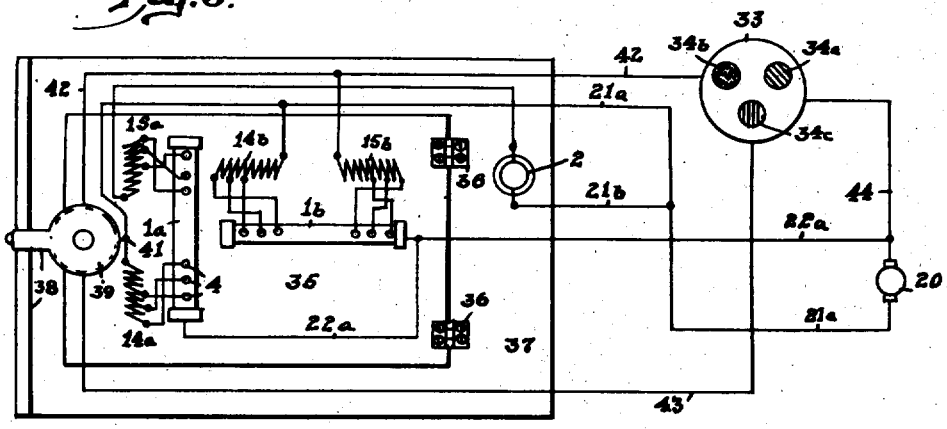
Fig. 9 is a plan view showing the principles of my invention embodied in an arrangement for use in connection with a radio frequency altimeter for maintaining the aeroplane in flight at a constant predetermined height above the ground.
Figure 10:
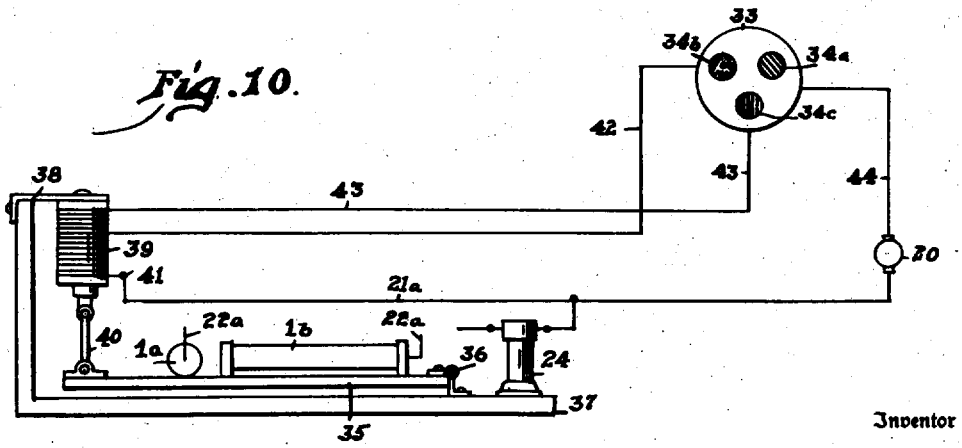
Fig. 10 is a side elevation of the same showing the altimeter and some of the wiring being omitted.

In Figs. 9 and 10 I show the aileron control tube 1*a* and the elevator control tube 1*b* mounted on a plate 35 which is hinged at one end, as at 36, to a platform 37 which is part of the body of the fuselage of the aeroplane and which is horizontal when the aeroplane is in normal level flight. The axis of movement of the plate 35 relative to the platform 37 is at right angles to the longitudinal axis of the elevator control tube 1*b* so that when the plate 35 is raised relative to the platform the tube 1*b* will be tipped in such manner as to shift the elevators so that the aeroplane will ascend and thus correct the elevation.

The platform 37 is provided with an upwardly extending bracket 38 which supports from above the vertically disposed solenoid 39 whose core is connected by the depending link 40 to the free end of the plate 35, so that when the solenoid is energized, the free end of the plate 35 will be raised, the control tube 1*b* will be tipped and the elevators shifted to cause the plane to ascend.

The front or lower end of the coil of the solenoid 39 is connected to the conductor 41 which is connected to the dynamo through the lead 21*a*. The coil is also divided into two sections, the rear ends of which are connected by the wires 42 and 43 to the conductors of the lights 34*b* and 34*c*, the wire 42 of the front or lower section being connected up with light 34*b* and the wire 43 of the rear or upper section being connected up to the light 34*c*. The altimeter is connected to the dynamo by the conductor 44 which is a branch of the lead 22*a*.

Thus when the light 34*a* is illuminated, the circuit of solenoid 39 is incomplete and the solenoid is not energized. When the yellow light 34*b* is illuminated the circuit is completed through the wire 42, energizing the lower section of the coil of the solenoid 39 and tilting the plate 35 and thereby causing the elevators to be shifted so as to cause the aeroplane to ascend. In case the drop of the aeroplane is so extensive as to illuminate the red light 34*c*, the circuit is interrupted through the wire 42 and is established through the wire 43, thus energizing the full length of the solenoid coil, causing a maximum tilt of the plate 35 and thereby causing the elevators to be swung into their maximum ascending position.

When the plane assumes the angle of climb determined by the tilt of the elevators the tube 1*b* is returned to horizontal and the elevators return to a normal position causing the plane to keep a steady angle of climb without looping, etc.

It is obvious that I have provided a complete control for aeroplanes whereby they are automatically maintained properly balanced and level in normal flight; whereby they are maintained at any predetermined elevation, and whereby an aeroplane inverted in flight is automatically righted.

What I claim is:—

1. In an aeroplane, a control system including solenoids arranged to activate the controls of the aeroplane, a make and break device comprising a tube of non-conductive material, contact members extending into the tube adjacent the ends thereof and connected to the coils of the solenoids, a body of conductive liquid contained in said tube, the liquid being out of contact with said contact members when the tube is level, and a conductor member extending longitudinally of the tube and normally immersed in said conductive liquid, said conductor being connected to a source of electrical current, means carried by the conductor to prevent surging of the liquid resulting from the movement of the tube, whereby when the tube is tipped electrical contact is made between one of the members and the conductive liquid and the corresponding solenoid is energized.

2. In an aeroplane, a control system including solenoids arranged to activate the ailerons and elevators of the aeroplane, a make and break device normally interposed in the circuit of one of the aileron-control solenoids and the circuit of the down-elevator-control solenoid, and arranged when the aeroplane is inverted to open said circuits and to complete the circuits of the other aileron-control solenoid and of the up-elevator-control solenoid, whereby the inverted aeroplane is caused to right itself in flight.

3. In an aeroplane, a control system including solenoids arranged to activate the controls of the aeroplane, a make and break device comprising a tube of insulating material arranged to be mounted on the aeroplane and disposed in a vertical position when the plane is in normal flight, a body of conductive liquid partially filling said tube, a pair of contact members extending into said tube and interposed in the circuit of one of the aileron-control solenoids and of the down-elevator-control solenoid, and contact members extending into said tube above the normal level of the conductive liquid therein, said contact members being in circuit with the other aileron control solenoid and the up-elevator-control solenoid, whereby when the plane is inverted the first mentioned circuits are broken and the second mentioned circuits are completed by said conductive liquid whereby the aeroplane is caused to right itself in flight.

4. In an aeroplane, a control system including solenoids arranged to activate the controls of the aeroplane, a make and break device comprising a tube of insulating material arranged to be mounted on the aeroplane and disposed in a vertical position when the plane is in normal flight, a body of conductive liquid partially filling said tube, a pair of contact members extending into said tube and interposed in the circuit of one of the aileron-control solenoids, and of the down-elevator-control solenoid, contact members extending into said tube above the normal level of the conductive liquid therein, said contact members being in circuit with the other aileron control solenoid and the up-elevator-control solenoid, whereby when the plane is inverted the first mentioned circuits are broken and the second mentioned circuits are completed by said conductive liquid whereby the aeroplane is caused to right itself in flight, and a body of non-electrolytic fluid in said tube superimposed on the conductive liquid to prevent jump-sparks between contact members not immersed in the conductive liquid.

5. In an aeroplane, a control system including a solenoid arranged to activate the up-elevator of the aeroplane, a make and break device comprising a tube of non-conductive material, a contact member extending into said tube adjacent to one end thereof, a body of conductive liquid contained in said tube and out of contact with said member when the tube is level but coming into contact with said member when the tube is tipped in the proper direction, said liquid being connected with a source of electric current whereby when the tube is tipped in the proper direction said solenoid is energized and the up-elevator is activated, an altimeter arranged to signal when the aeroplane descends below a predetermined elevation, and means whereby when said signal is given the tube is tipped to energize said solenoid.

6. In an aeroplane, a control system including a solenoid arranged to activate the up-elevator of the aeroplane, a make and break device comprising a tube of non-conductive material, a contact member extending into said tube adjacent to one end thereof, a body of conductive liquid contained in said tube and out of contact with said member when the tube is level but coming into contact with said member when the tube is tipped in the proper direction, said liquid being connected with a source of electric current whereby when the tube is tipped in the proper direction said solenoid is energized and the up-elevator is activated, a radio frequency altimeter arranged to signal the descent of the aeroplane below a predetermined elevation, and means whereby the completion of the signal circuit causes the tube to be tipped to energize said solenoid.

7. In an aeroplane, a control system including a solenoid arranged to activate the up-elevator of the aeroplane, a make and break device comprising a tube of non-conductive material, a contact member extending into said tube adjacent to one end thereof, a body of conductive liquid contained in said tube and out of contact with said member when the tube is level but coming into contact with said member when the tube is tipped in the proper direction, said liquid being connected with a source of electric current whereby when the tube is tipped in the proper direction said solenoid is energized and the up-elevator is activated, a radio frequency altimeter arranged to signal the descent of the aeroplane below a predetermined elevation, a second solenoid, connections between the tube and the second solenoid whereby when the second solenoid is energized said tube is tipped and said first solenoid is energized, and electrical connections whereby when the signal of the altimeter is given said second solenoid is energized.

8. In means for maintaining an aeroplane in flight at a predetermined elevation, the combination of a solenoid having its coil divided into sections and arranged to activate the up-elevator of the aeroplane, the degree of activation depending on the number of coil sections which are energized, a make and break device included in circuit with said solenoid and arranged by being tipped to complete the circuit through said coil sections, the extent of such tipping determining the number of coil sections energized, an electrical altimeter, a second solenoid operatively connected to said tube and arranged when energized to tip the tube to energize the first solenoid, the coil of the second solenoid being also divided into sections and the extent to which said tube is tipped depending upon the number of sections of the coil of the second solenoid which are energized, and electrical connections including the altimeter and the second solenoid whereby when the plane descends to various levels below the predetermined elevation of flight the sections of the coil of said second solenoid are energized.

9. In means for maintaining an aeroplane in flight at a predetermined elevation, the combination of a solenoid having its coil divided into sections and arranged to activate the up-elevator of the aeroplane, the degree of activation depending on the number of coil sections which are energized, a make and break device included in circuit with said solenoid and arranged by being tipped to complete the circuit through said coil sections, the extent of such tipping determining the number of coil sections energized, a radio frequency altimeter arranged to give a signal when the aeroplane descends below the predetermined elevation of flight and a second signal when the aeroplane further descends, and electrical connections including the altimeter and the second solenoid whereby when the first signal is given one section of the second solenoid is energized and when the second signal is given the entire coil of the second solenoid is energized.

JAMES M. HENDRICKSON.